(12) United States Patent
Narutani et al.

(10) Patent No.: US 8,977,534 B2
(45) Date of Patent: Mar. 10, 2015

(54) CONTROLLER SUPPORT APPARATUS, CONTROLLER SUPPORT PROGRAM EXECUTED ON THE APPARATUS, STORAGE MEDIUM STORING THE PROGRAM, AND METHOD OF ESTIMATING EXECUTION TIME OF CONTROL PROGRAM

(75) Inventors: Fumiaki Narutani, Kusatu (JP); Taku Oya, Moriyama (JP); Yoshiya Shibata, Ibaraki (JP)

(73) Assignee: Omron Corporation, Kyoto (JP)

( * ) Notice: Subject to any disclaimer, the term of this patent is extended or adjusted under 35 U.S.C. 154(b) by 475 days.

(21) Appl. No.: 13/399,111

(22) Filed: Feb. 17, 2012

(65) Prior Publication Data
US 2012/0239978 A1 Sep. 20, 2012

Related U.S. Application Data

(63) Continuation of application No. PCT/JP2011/056770, filed on Mar. 22, 2011.

(30) Foreign Application Priority Data

Mar. 15, 2011 (JP) .................................. 2011-056775

(51) Int. Cl.
*G06F 9/45* (2006.01)
*G06F 11/36* (2006.01)
*G06F 11/34* (2006.01)

(52) U.S. Cl.
CPC ............ *G06F 11/3612* (2013.01); *G06F 8/443* (2013.01); *G06F 11/3447* (2013.01)
USPC .......................................................... 703/22

(58) Field of Classification Search
CPC . G06F 8/443; G06F 11/3447; G06F 11/3457; G06F 2201/865; G06F 11/3428; G06F 11/3612
USPC .......................................................... 703/22
See application file for complete search history.

(56) References Cited

U.S. PATENT DOCUMENTS

2011/0113224 A1* 5/2011 Isshiki et al. ................... 712/240
2011/0154127 A1* 6/2011 Bhandari et al. ............. 714/47.3
2011/0288846 A1* 11/2011 Kihas .............................. 703/13

FOREIGN PATENT DOCUMENTS

JP 2001-209411 8/2001
JP 2008-123559 5/2008

OTHER PUBLICATIONS

Jay Fenlason, The GNU Profiler, 52 pages, 2000.*

*Primary Examiner* — David Silver
(74) *Attorney, Agent, or Firm* — Greenblum & Bernstein, P.L.C.

(57) ABSTRACT

A controller support program causes a processor to acquire a first control execution time which is an execution time of a first control program which is an object program generated from a control source program, which is a source program of a control program generated in accordance with an object of control of a user, and operating at the simulator, the first control execution time being measured at the simulator. The processor also calculates an estimated execution time which is an estimated value of an execution time, at the controller, of a second control program which is an object program generated from the control source program and operating at the controller, by converting the first control execution time using the calibration data. Data representing the estimated execution time is output.

7 Claims, 10 Drawing Sheets

US 8,977,534 B2

CONTROLLER SUPPORT APPARATUS, CONTROLLER SUPPORT PROGRAM EXECUTED ON THE APPARATUS, STORAGE MEDIUM STORING THE PROGRAM, AND METHOD OF ESTIMATING EXECUTION TIME OF CONTROL PROGRAM

CROSS-REFERENCE TO RELATED APPLICATIONS

This is a continuation application of PCT/JP2011/056770 filed Mar. 22, 2011, designating the United States of America, the disclosure of which, including the specification, drawings, and claims, is incorporated by reference in its entirety. The disclosure of Japanese Patent Application No. 2011-056775 filed Mar. 15, 2011, including the specification, drawings, and claims is expressly incorporated herein by reference in its entirety.

FIELD OF DISCLOSURE

The present disclosure relates to estimation of the execution time of a control program on a controller support apparatus for supporting use of a controller such as PLC (Programmable Logic Controller, also referred to as "programmable controller") that is used for controlling operations of machinery or equipment, for example.

BACKGROUND INFORMATION

Controllers used for controlling operations of machinery, equipment, or the like include general-purpose PLCs, and program control controllers dedicated to individual machines, for example.

A PLC is configured from, for example, a plurality of units such as a CPU (Central Processing Unit) unit that includes a microprocessor for executing control programs, and an IO (Input/Output) unit that handles signal inputs from an external switch or a sensor and signal outputs to an external relay device or an actuator. The PLC executes control operation while exchanging data through a PLC system bus and/or a field network between the units for each control program execution cycle.

The controller support apparatus is used for generating various types of setting information for control programs to be executed by a controller or for the controller, and transferring the setting information to the controller. The controller support apparatus is configured by, for example, installing a controller support program on a general-purpose computer. The controller support apparatus includes, for example, an editor function of generating a source list of a control program, a compiler function of generating, from the source list of the controller program, an object program that operates on a controller, a controller simulator function of performing test execution of the control program at the controller support apparatus, and a function of communicating with the controller.

At the development stage of a control program, it is necessary to know the execution time required for the controller to execute the control program. This execution time of the control program is referenced when setting the interval of the execution cycle of the control program. Also, when setting mutually different execution priorities and execution cycle intervals for a plurality of control programs to be executed by the controller, the execution time of each control program is referenced.

In many cases, hardware and the operation system relating to execution of the control program differ between the controller support apparatus and the controller. Also, the execution code of the control program for a simulator may be different from that for a controller. Therefore, the execution time of a control program executed by the simulator of the controller support apparatus may be different from the execution time of the control program executed by the controller.

JP 2001-209411A (Patent Document 1) discloses a method in which the execution time required when a control program is executed by a PLC is obtained at a PLC support apparatus. Specifically, a method is disclosed in which actual process time data at the PLC for each command used in the control program is prepared, and each time a command is processed in a program simulation execution process at a simulator, the actual process time data is referenced and the actual process time corresponding to the command is accumulated.

PATENT DOCUMENTS

Patent Document 1: JP2001-209411A

Problem to be Solved by the Disclosure

Conventional PLCs employ, as the operation unit thereof, an ASIC (Application Specific Integrated Circuit) developed for executing control programs, and many conventional PLCs have a configuration in which the ASIC executes execution code corresponding to a mnemonic command for PLC. Generally, commands used in PLC programming languages such as a ladder language can be converted into mnemonic commands for PLC on a one-to-one basis. In this case, as disclosed in Patent Document 1, execution time of a control program could be obtained with a certain level of accuracy by using a method in which actual process time data for each command is accumulated.

However, in recent years, general-purpose microprocessors are employed in a larger number of PLCs as the operation unit thereof due to improved speed. In such a case, a control program (source program) written in the ladder language or other PLC programming language is executed by the PLC in a state complied into an object program that the microprocessor can execute. According to experience of the inventors of the present disclosure, the actual process time at the microprocessor corresponding to each command in the PLC programming language is not necessarily constant due to influence of optimization of the object program, for example. Therefore, with the method of accumulating the actual process time data as described above, highly accurate estimated execution time cannot be obtained. In addition, if the control program uses a library of a function block or a special command, the execution time of the called library element fluctuates depending on the execution conditions, and thus execution time estimation accuracy is further deteriorated with the method of accumulating actual process time data.

Under these circumstances, a method capable of estimating, at a controller support apparatus, the execution time of a PLC (more generally called "controller") that uses a general-purpose microprocessor with higher accuracy is necessary. Of course, it is preferable that the method also is applicable to execution time estimation for controllers using the ASIC.

The present disclosure aims to estimate, in a controller support apparatus, control program execution time at a controller with higher accuracy.

SUMMARY OF THE DISCLOSURE

According to one aspect of the present disclosure, a controller support apparatus includes a storage unit (a storage)

and an operation unit (a processor or computer apparatus). The storage unit is used for storing a controller support program and calibration data representing a relation between a first test execution time and a second test execution time. The first test execution time is an execution time of a first test program which is an object program generated from a test source program and operating at a simulator of a controller. The first test execution time is measured at the simulator. The second test execution time is an execution time of a second test program which is an object program generated from the test source program and operating at the controller. The second test execution time is measured at the controller. The controller support program causes the operation unit to execute a process of acquiring a first control execution time which is an execution time of a first control program which is an object program generated from a control source program, which is a source program of a control program generated in accordance with an object of control of a user, and operating at the simulator. The the first control execution time is measured at the simulator. The controller support program also causes the operation unit to execute a process of calculating an estimated execution time which is an estimated value of an execution time, at the controller, of a second control program which is an object program generated from the control source program and operating at the controller, by converting the first control execution time using the calibration data, and a execute a process for outputting data representing the estimated execution time.

Preferably, the storage unit is further used for storing the first control program. The controller support program further causes the operation unit to execute a process of causing the controller support apparatus to function as the simulator and a process of measuring the first control execution time by executing the first control program at the simulator.

More preferably, the controller support apparatus further includes a display unit (a display). The storage unit is further used for storing the first test program and the second test execution time. The controller support program further causes the operation unit to execute a process of measuring the first test execution time by executing the first test program at the simulator, and a process of calculating the calibration data from the first test execution time and the second test execution time. The process for outputting data representing the estimated execution time is a process of generating display data for causing the display unit to display the estimated execution time.

According to another aspect of the present disclosure, a controller support program to be executed by a controller support apparatus including a storage unit (a storage) and an operation unit (a processor or computer apparatus) is provided. The storage unit is used for storing the controller support program and calibration data representing a relation between a first test execution time and a second test execution time. The first test execution time is an execution time of a first test program which is an object program generated from a test source program and operating at a simulator of a controller. The first test execution time is measured at the simulator. The second test execution time is an execution time of a second test program which is an object program generated from the test source program and operating at the controller. The second test execution time is measured at the controller. The controller support program causes the operation unit to execute a process of acquiring a first control execution time which is an execution time of a first control program which is an object program generated from a control source program, which is a source program of a control program generated in accordance with an object of control of a user, and operating at the simulator. The first control execution time is measured at the simulator. Also executed by the operation unit is a process of calculating an estimated execution time which is an estimated value of an execution time, at the controller, of a second control program which is an object program generated from the control source program and operating at the controller, by converting the first control execution time using the calibration data; and a process for outputting data representing the estimated execution time.

Preferably, the storage unit is further used for storing the first control program. The controller support program further causes the operation unit to execute a process of causing the controller support apparatus to function as the simulator, and a process of measuring the first control execution time by executing the first control program at the simulator.

More preferably, the storage unit is further used for storing the first test program and the second test execution time. The controller support program further causes the operation unit to execute: a process of measuring the first test execution time by executing the first test program at the simulator, and a process of calculating the calibration data from the first test execution time and the second test execution time.

According to still another aspect of the present disclosure, a storage medium storing a controller support program to be executed by a controller support apparatus includes a storage unit (storage) and an operation unit (processor or computer apparatus). The storage unit is used for storing the controller support program and calibration data representing a relation between a first test execution time and a second test execution time. The first test execution time is an execution time of a first test program which is an object program generated from a test source program and operating at a simulator of a controller. The first test execution time is measured at the simulator. The second test execution time is an execution time of a second test program which is an object program generated from the test source program and operating at the controller. The second test execution time is measured at the controller. The controller support program causes the operation unit to execute a process of acquiring a first control execution time which is an execution time of a first control program which is an object program generated from a control source program, which is a source program of a control program generated in accordance with an object of control of a user, and operating at the simulator, and the first control execution time is measured at the simulator, a process of calculating an estimated execution time which is an estimated value of an execution time, at the controller, of a second control program which is an object program generated from the control source program and operating at the controller, by converting the first control execution time using the calibration data, and a process for outputting data representing the estimated execution time.

Preferably, the storage unit is further used for storing the first control program. The controller support program further causes the operation unit to execute a process of causing the controller support apparatus to function as the simulator, and a process of measuring the first control execution time by executing the first control program at the simulator.

More preferably, the storage unit is further used for storing the first test program and the second test execution time. The controller support program further causes the operation unit to execute a process of measuring the first test execution time by executing the first test program at the simulator, and a process of calculating the calibration data from the first test execution time and the second test execution time.

According to yet another aspect of the present disclosure, a method of estimating an execution time of a control program of a controller controlling an object to be controlled is provided. This method includes a calibration data calculation step of calculating calibration data representing a relation between a first test execution time and a second test execution time. The first test execution time is an execution time of a first test program which is an object program generated from a test source program and operating at a simulator of the controller. The first test execution time is measured at the simulator. The second test execution time is an execution time of a second test program which is an object program generated from the test source program and operating at the controller. The second test execution time is measured at the controller. The method further includes an estimated execution time calculation step of using a first control execution time which is an execution time of a first control program which is an object program generated from a control source program, which is a source program of a control program generated in accordance with an object of control of a user, and operating at the simulator. The first control execution time is measured at the simulator. The method allows calculation of an estimated execution time which is an estimated value of an execution time, at the controller, of a second control program which is an object program generated from the control source program and operating at the controller, by converting the first control execution time using the calibration data.

According to still another aspect of the disclosure, a non-transitory computer readable storage medium storing a controller support program is provided that allows a computer apparatus to estimate control program execution time. The program allowing the computer apparatus to acquire a first control execution time that includes an execution time of a first control program which is an object program generated from a control source program, which is a source program of a control program generated in accordance with an object of control of a user, and operating at a simulator, the first control execution time being measured at the simulator. Additionally, the program allows the computer apparatus to calculate an estimated execution time comprising an estimated value of an execution time, at a controller, of a second control program which is an object program generated from the control source program and operating at the controller, by converting the first control execution time using calibration data representing a relationship between a first test execution time a second test execution time. Further, the program allows the computer apparatus to output data representing the estimated execution time. The first test execution time is an execution time of a first test program which is an object program generated from a test source program and operating at a simulator of the controller. The first test execution time is measured at the simulator. The second test execution time is an execution time of a second test program which is an object program generated from the test source program and operating at the controller. The second test execution time is measured at the controller.

According to another aspect of the disclosure, the storage stores the first control program, and the controller support program further causes the computer apparatus to cause the controller support apparatus to function as the simulator, and measure the first control execution time by executing the first control program at the simulator.

According to another aspect of the disclosure, the storage stores the first test program and the second test execution time, and the controller support program further causes the computer apparatus to measure the first test execution time by executing the first test program at the simulator, and calculate the calibration data from the first test execution time and the second test execution time.

Effects of the Disclosure

With the present disclosure, it is possible to estimate, in a controller support apparatus, a control program execution time at a controller with higher accuracy.

DETAILED DESCRIPTION

Figure 1:
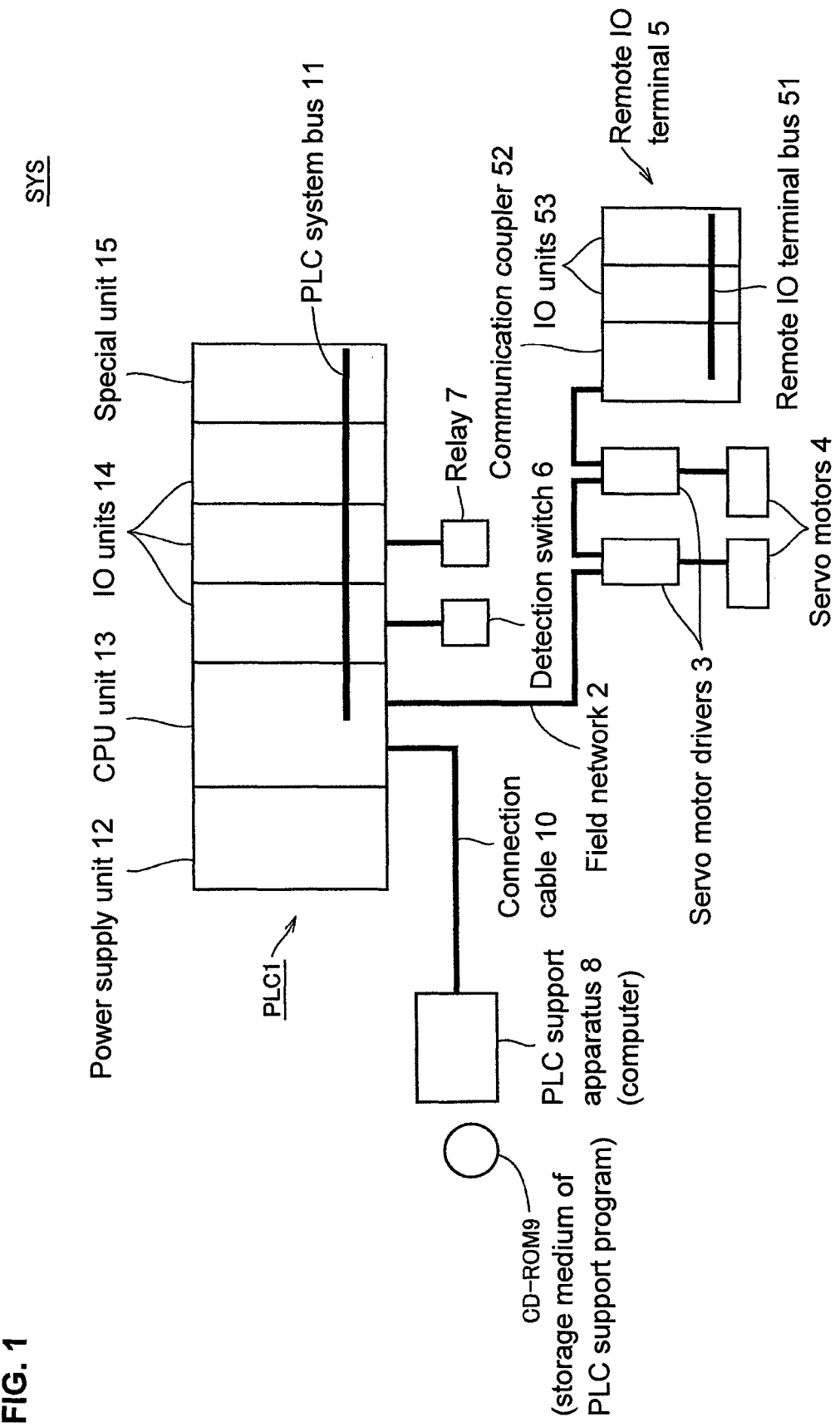
FIG. 1 is a schematic diagram illustrating a schematic configuration of a PLC system, use of which is supported by a controller (PLC) support apparatus according to an embodiment of the present disclosure.

In the following, embodiments of the disclosure are explained in detail with reference to the accompanying drawings. It should be noted that in the drawings, identical or corresponding portions have been assigned the same reference numerals, and their explanation is not repeated.

A. System Configuration

A PLC will be described as a typical example of a controller, use of which is supported by a controller support apparatus according to the present embodiment. The PLC controls objects to be controlled such as machinery or equipment. The PLC includes a CPU unit as its element. The CPU unit includes a microprocessor, storage means (a storage), and a communication circuit. The storage means is used for storing control programs and system programs for controlling program execution, for example. The microprocessor executes system programs and control programs stored in the storage means. The communication circuit sends output data and receives input data.

First, the system configuration of a PLC 1 will be described with reference to FIG. 1. FIG. 1 is a schematic diagram illustrating a schematic configuration of a PLC system, use of which is supported by a controller (PLC) support apparatus according to an embodiment of the present disclosure.

Referring to FIG. 1, a PLC system SYS includes the PLC 1, servo motor drivers 3 and a remote IO terminal 5 that are connected to the PLC 1 via a field network 2, and a detection switch 6 and a relay 7 as field devices. Also, a controller support apparatus 8 is connected to the PLC 1 via a connection cable 10 or the like.

The PLC 1 includes a CPU unit 13 that executes main arithmetic processing, at least one IO unit 14, and a special unit 15. These units are configured such that they can mutually exchange data via a PLC system bus 11. Also, these units are supplied with power at an appropriate voltage by a power supply unit 12. Note that since each unit that constitutes the PLC 1 is provided by PLC manufacturers, generally, each PLC manufacturer independently develops the PLC system bus 11 for use. In contrast, with respect to the field network 2, its standard or the like is disclosed in many cases such that products manufactured by different manufacturers can be connected to each other.

Figure 2:
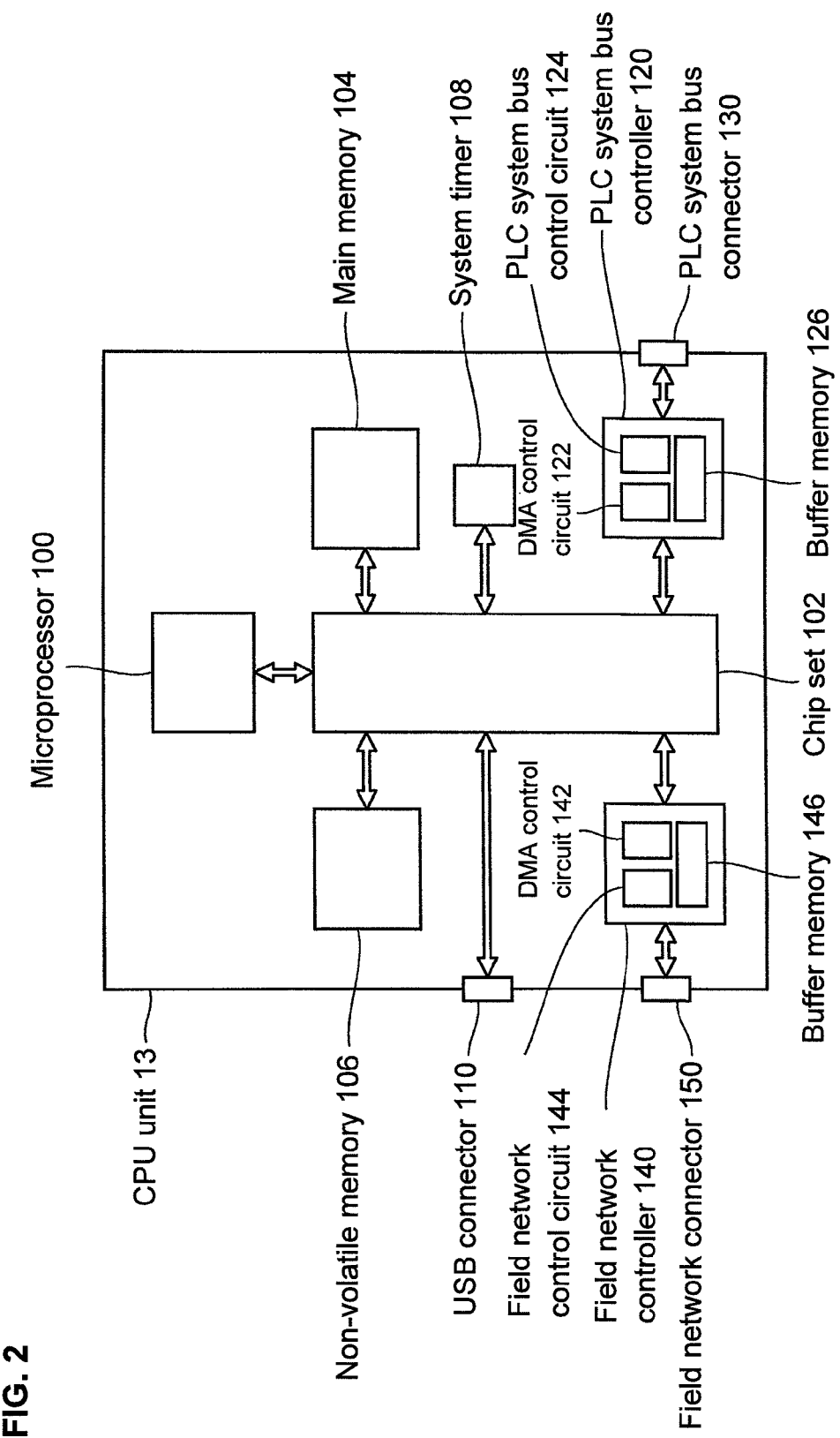
FIG. 2 is a schematic diagram illustrating a hardware configuration of a CPU unit, use of which is supported by the controller (PLC) support apparatus according to an embodiment of the present disclosure.

The CPU unit 13 will be described in detail with reference to FIG. 2. The IO unit 14 is a unit relating to a general input and output process, and handles input and output of binarized data such as "on" and "off". That is, the IO unit 14 collects information as to whether a sensor such as the detection switch 6 is in a state where the sensor has detected an object to be detected ("on" state) or in a state where the sensor has detected no object to be detected ("off" state). Also, the IO unit 14 outputs either an instruction for activation ("on" instruction) or an instruction for deactivation ("off" instruction) to an output destination such as the relay 7 or an actuator.

The special unit 15 has functions that are not supported by the IO unit 14, for example, input and output of analog data, temperature control, or communication by a specific communication system.

The field network 2 transmits various types of data to be exchanged with the CPU unit 13. Typically, various types of industrial Ethernet® systems can be used as the field network 2. For example, EtherCAT®, Profinet IRT, MECHATROLINK®-III, Powerlink, SERCOS®-III, and CIP Motion are known as industrial Ethernet® systems, and any of these may be employed. In addition, a field network that is not an industrial Ethernet® may be used. For example, if motion control is not performed, DeviceNet, CompoNet/IP® and the like may be used.

Note that although a PLC system SYS that includes both the PLC system bus 11 and the field network 2 is shown in FIG. 1 as an example, a system configuration may be adopted in which only one of them is included. For example, all units may be connected to each other with the field network 2. Alternatively, the servo motor drivers 3 may be directly connected to the PLC system bus 11 without using the field network 2. Furthermore, a communication unit of the field network 2 may be connected to the PLC system bus 11, such that communication with devices connected to the field network 2 from the CPU unit 13 is performed via that communication unit.

Note that the PLC 1 may have a configuration in which the CPU unit 13 directly controls units to be controlled, not through the IO units 14 or the servo motor drivers 3, by providing the CPU unit 13 with the function of the IO units 14 or the servo motors driver 3.

The servo motor drivers 3 are connected to the CPU unit 13 via the field network 2, and drive the servo motors 4 in accordance with instruction values from the CPU unit 13. More specifically, the servo motor drivers 3 receive, from the PLC 1, instruction values such as a position instruction value, a velocity instruction value and a torque instruction value at fixed intervals. Also, the servo motor drivers 3 acquire actual measured values relating to the operations of the servo motors 4 such as the position, velocity (typically, this is calculated based on the difference between the current position and the previous position) and a torque, from detectors such as a position sensor (rotary encoder) and a torque sensor that are connected to the shafts of the servo motors 4. Then, the servo motor drivers 3 perform feedback control by setting the instruction values from the CPU unit 13 as the target values, and using the actual measured values as the feedback values. That is, the servo motor drivers 3 adjust the current for driving the servo motors 4 such that the actual measured values approach the target values. Note that the servo motor drivers 3 may also be referred to as a servo motor amplifier.

Although a system example in which the servo motors 4 and the servo motor drivers 3 are combined is shown in FIG. 1, other configurations may be also adopted, for example, a system in which a pulse motor and a pulse motor driver are combined.

The remote IO terminal 5 is further connected to the field network 2 of the PLC system SYS shown in FIG. 1. Basically, the remote IO terminal 5 performs processing relating to a general input and output process, as with the IO unit 14. More specifically, the remote IO terminal 5 includes a communication coupler 52 for performing processing relating to data transmission through the field network 2, and one or more IO units 53. These units are configured to be capable of exchanging data with each other via a remote IO terminal bus 51.

The controller support apparatus 8 according to the present embodiment will be described later.

B. Hardware Configuration of CPU

Next, with reference to FIG. 2, a hardware configuration of the CPU unit 13 will be described. FIG. 2 is a schematic diagram illustrating the hardware configuration of the CPU unit 13, use of which is supported by the controller (PLC) support apparatus 8 according to an embodiment of the present disclosure. Referring to FIG. 2, the CPU unit 13 includes a microprocessor 100, a chip set 102, a main memory 104, a non-volatile memory 106, a system timer 108, a PLC system bus controller 120, a field network controller 140, and a USB connector 110. The chip set 102 is connected to other components via various types of buses.

Typically, the microprocessor 100 and the chip set 102 are configured according to general computer architectures. That is, the microprocessor 100 interprets and executes command codes that are supplied in order from the chip set 102 according to an internal clock. The chip set 102 exchanges internal data with various components connected thereto, and also generates command codes necessary for the microprocessor 100. In addition, the chip set 102 has a function of caching, for example, data acquired as a result of execution of arithmetic processing by the microprocessor 100.

The CPU unit 13 includes the main memory 104 and the non-volatile memory 106 as its storage means.

The main memory 104 is a volatile storage area (RAM), and holds various programs to be executed by the microprocessor 100 after the CPU unit 13 is powered on. Also, the main memory 104 is used as a working memory when the microprocessor 100 executes various programs. A device such as a DRAM (Dynamic Random Access Memory) or a SRAM (Static Random Access Memory) is used as the main memory 104.

The non-volatile memory 106 holds data such as a real-time OS (Operating System), system programs of the PLC 1, user programs, motion operation programs, system setting parameters in a non-volatile manner. These programs and data are copied in the main memory 104 as required such that the microprocessor 100 can access them. Semiconductor memories such as a flash memory can be used as the non-volatile memory 106. Alternatively, a magnetic storage medium such as hard disk drive, an optical storage medium such as DVD-RAM (Digital Versatile Disk Random Access Memory), and the like may be used.

The system timer 108 generates an interrupt signal at fixed intervals and thereby provides the interrupt signal to the microprocessor 100. Typically, the system timer 108 is configured such that it generates interrupt signals at a plurality of different intervals depending on hardware specifications. However, it is also possible to perform setting with the OS (Operating System), the BIOS (Basic Input Output System), or the like such that interrupt signals are generated at arbitrary intervals. Control operation for each control cycle, which is to be described later, is realized by using an interrupt signal generated by the system timer 108.

The CPU unit 13 includes the PLC system bus controller 120 and the field network controller 140 as the communication circuit. These communication circuits send output data and receive input data.

Note that if the CPU unit 13 is provided with a function of the IO units 14 or the servo motor drivers 3, sending of output data and receiving of input data by the communication circuit will be performed inside the CPU unit 13, while having the unit performing the corresponding function as the other party of communication.

The PLC system bus controller 120 controls exchange of data via the PLC system bus 11. More specifically, the PLC system bus controller 120 includes a DMA (Dynamic Memory Access) control circuit 122, a PLC system bus control circuit 124, and a buffer memory 126. Note that the PLC system bus controller 120 is internally connected to the PLC system bus 11 via a PLC system bus connector 130.

The buffer memory 126 functions as a send buffer of data to be output to other units via the PLC system bus 11 (hereinafter also referred to as "output data") and a receive buffer of data to be input from other units via the PLC system bus 11 (hereinafter also referred to as "input data"). Note that output data generated as a result of arithmetic processing by the microprocessor 100 is initially stored in the main memory 104. Then, output data to be transferred to a specific unit is read out from the main memory 104, and temporarily held in the buffer memory 126. Also, input data transferred from other units is temporarily held in the buffer memory 126, and then transferred to the main memory 104.

The DMA control circuit 122 transfers output data from the main memory 104 to the buffer memory 126, and transfers input data from the buffer memory 126 to the main memory 104.

The PLC system bus control circuit 124 performs a process of sending output data in the buffer memory 126 to other units connected to the PLC system bus 11 and a process of receiving input data and storing the input data in the buffer memory 126 from the other units. Typically, the PLC system bus control circuit 124 provides the functions of a physical layer and a data link layer in the PLC system bus 11.

The field network controller 140 controls data exchange via the field network 2. That is, the field network controller 140 controls sending of output data and receiving of input data according to the used standard of the field network 2. For example, when a field network 2 conforming to the EtherCAT® standard is used, a field network controller 140 that includes hardware for performing normal Ethernet® communication is used. With the EtherCAT® standard, a general Ethernet® controller that realizes a communication protocol conforming to an ordinary Ethernet® standard can be used. Depending on the type of the industrial Ethernet® employed as the field network 2, an Ethernet® controller supporting the communication protocol of dedicated specifications that is not an ordinary communication protocol is used. Also, if a field network other than the industrial Ethernet® is employed, a dedicated field network controller conforming to the corresponding standard is used.

A buffer memory 146 functions as a send buffer of data to be output to other apparatuses or the like via the field network 2 (hereinafter, this data is also referred to as "output data") and a receive buffer of data to be input from other apparatuses or the like via the field network 2 (hereinafter, this data is also referred to as "input data"). As described above, output data generated as a result of arithmetic processing performed by the microprocessor 100 is initially stored in the main memory 104. Then, output data to be transferred to a specific apparatus is read out from the main memory 104, and temporarily held in the buffer memory 146. Also, input data transferred from other apparatuses is temporarily held in the buffer memory 146, and then transferred to the main memory 104.

A DMA control circuit 142 transfers output data from the main memory 104 to the buffer memory 146, and transfers input data from the buffer memory 146 to the main memory 104.

A field network control circuit 144 performs a process of sending output data in the buffer memory 146 to other apparatuses connected to the field network 2 and a process of receiving input data from the other apparatuses and storing the input data in the buffer memory 146. Typically, the field network control circuit 144 provides the functions of a physical layer and a data link layer in the field network 2.

The USB connector 110 is an interface for connecting the controller support apparatus 8 and the CPU unit 13. Typically, programs and the like executable by the microprocessor 100 of the CPU unit 13, which are transferred from the controller support apparatus 8, are loaded to the PLC 1 via the USB connector 110.

C. Software Configuration of CPU

Next, a software group used for a controller (PLC 1) to provide various types of functions will be described with reference to FIG. 3. Command code included in the software is read out at an appropriate time, and executed by the microprocessor 100 of the CPU unit 13.

Figure 3:
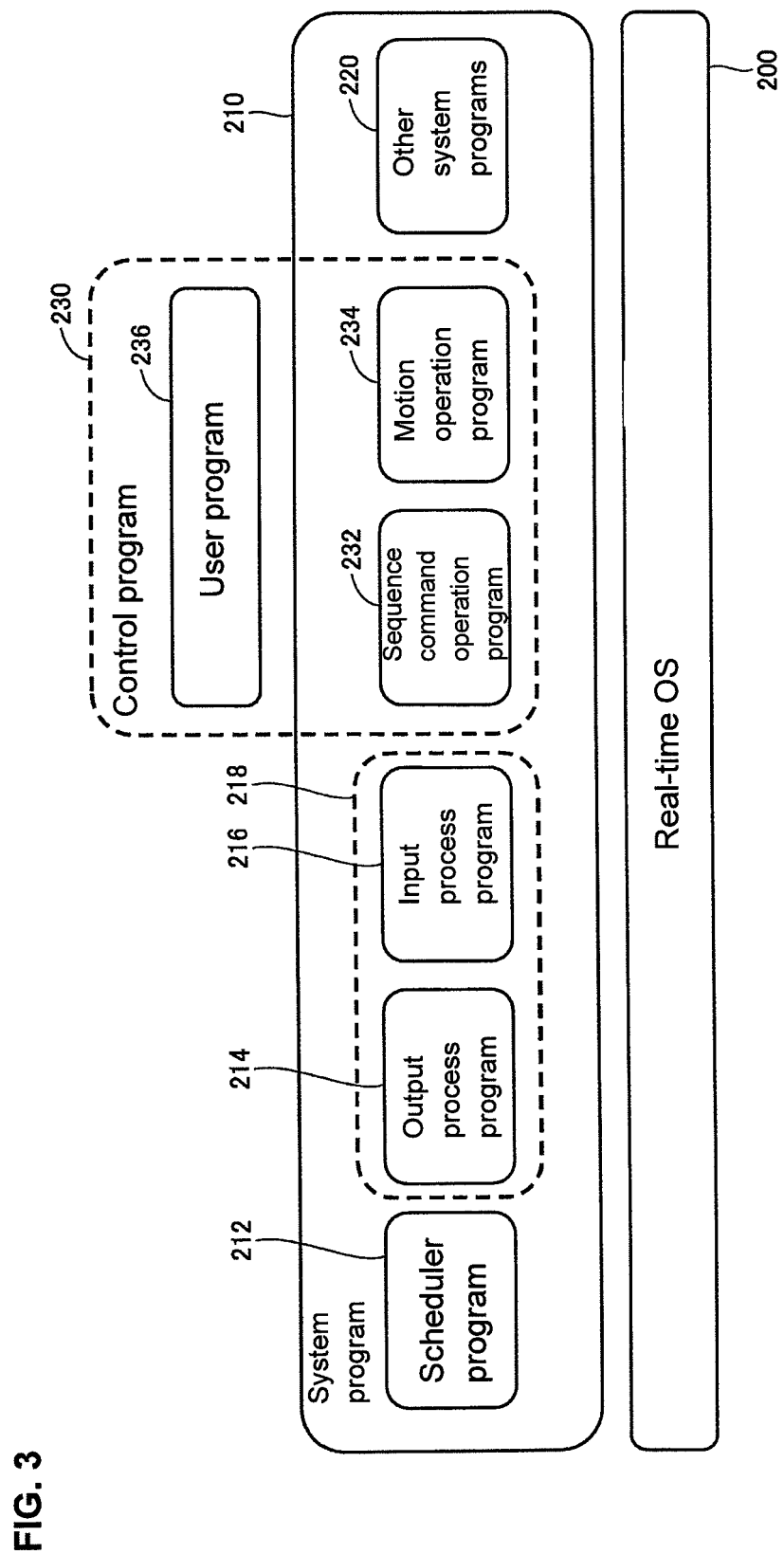
FIG. 3 is a schematic diagram illustrating a configuration of software that is executed by the CPU unit, use of which is supported by the controller (PLC) support apparatus according to an embodiment of the present disclosure.

FIG. 3 is a schematic diagram illustrating a configuration of software executed by the CPU unit 13, used of the software being supported by the controller (PLC) support apparatus 8 according to an embodiment of the present disclosure. Referring to FIG. 3, software to be executed by the CPU unit 13 has a three-layer structure including a real-time OS 200, a system program 210, and a user program 236.

The real-time OS 200 is designed according to the computer architecture of the CPU unit 13, and provides a fundamental execution environment for the microprocessor 100 to execute the system program 210 and the user program 236. This real-time OS is typically provided by PLC manufacturers or specialized software companies.

The system program 210 is a software group for providing functions as the PLC 1. Specifically, the system program 210 includes a scheduler program 212, an output process program 214, an input process program 216, a sequence command operation program 232, a motion operation program 234, and other system programs 220. Note that generally, the output process program 214 and the input process program 216 are executed in series (as a single process), these programs may be sometimes referred to as an IO process program 218.

The user program 236 is generated in accordance with an object of control of a user. That is, it is a program arbitrarily designed according to a line (process) or the like to be controlled by using the PLC system SYS.

The user program 236 realizes the object of control of the user cooperatively with the sequence command operation program 232 and the motion operation program 234. That is, the user program 236 realizes programmed operations by using commands, functions, function modules, or the like provided by the sequence command operation program 232 and the motion operation program 234. Therefore, the user program 236, the sequence command operation program 232 and the motion operation program 234 may be collectively referred to as a control program 230.

Each program will be described in detail below.

The user program 236 is generated according to an object of control of the user (e.g., line or process to be controlled) as described above. Typically, the user program 236 is in an object program executable by the microprocessor 100 of the CPU unit 13. This user program 236 is generated as a result of a source program described in the ladder language or the like being compiled in the controller support apparatus 8, for example. The generated user program 236 as an object program is transferred from the controller support apparatus 8 to the CPU unit 13 via the connection cable 10, and is stored in the non-volatile memory 106 or the like.

The scheduler program 212 controls start of process and restart of interrupted process in each execution cycle with respect to the output process program 214, the input process program 216, and the control program 230. More specifically, the scheduler program 212 controls execution of the user program 236 and the motion operation program 234.

In the CPU unit 13, an execution cycle (control cycle) having a fixed interval that is suitable for the motion operation program 234 is employed as a common cycle for the entire process. Therefore, it is difficult to complete all processes during a single control cycle, and thus a process whose execution should be completed during a single control cycle and a process that may be executed across a plurality of control cycles are distinguished depending on the priority of the process to be executed. The scheduler program 212 manages the execution order or the like of these distinguished processes. More specifically, the scheduler program 212 performs management such that programs given higher priorities are executed earlier during the period of each control cycle.

The output process program 214 rearranges output data generated as a result of execution of the user program 236 (control program 230) into a format suitable for transfer to the PLC system bus controller 120 and/or the field network controller 140. If the PLC system bus controller 120 or the field network controller 140 requires an instruction to perform sending from the microprocessor 100, the output process program 214 will issue the instruction.

The input process program 216 rearranges input data received by the PLC system bus controller 120 and/or the field network controller 140 into a format suitable for use by the control program 230.

The sequence command operation program 232 is called when a certain type of sequence command used in the user program 236 is executed, and executed for realizing the command.

The motion operation program 234 is executed according to instructions provided by the user program 236, and calculates instruction values output to a motor driver such as the servo motor drivers 3 or a pulse motor driver at every execution.

The other system programs 220 collectively show a program group for realizing various types of functions of the PLC 1 other than the programs specifically shown in FIG. 3.

The real-time OS 200 provides an environment for switching and executing a plurality of programs with the lapse of time. In the PLC 1, as an event (interrupt) for outputting (sending) output data generated as a result of program execution by the CPU unit 13 to other units or other apparatuses, a control cycle start interrupt is set as default. When the control cycle start interrupt has occurred, the real-time OS 200 switches the program to be executed by the microprocessor 100 from a program being executed at that time to the scheduler program 212. Note that the real-time OS 200 executes a program included in the other system programs 210 when neither the scheduler program 212 nor a program whose execution is controlled by the scheduler program 212 is being executed. Examples of such a program include programs relating to the communication process between the CPU unit 13 and the controller support apparatus 8 via the connection cable 10 (USB) or the like.

Note that the control program 230 and the scheduler program 212 are stored in the main memory 104 and the non-volatile memory 106 serving as storage means.

D. Execution Operation in CPU

Next, execution operation performed by the CPU unit 13 will be described.

Figure 4:
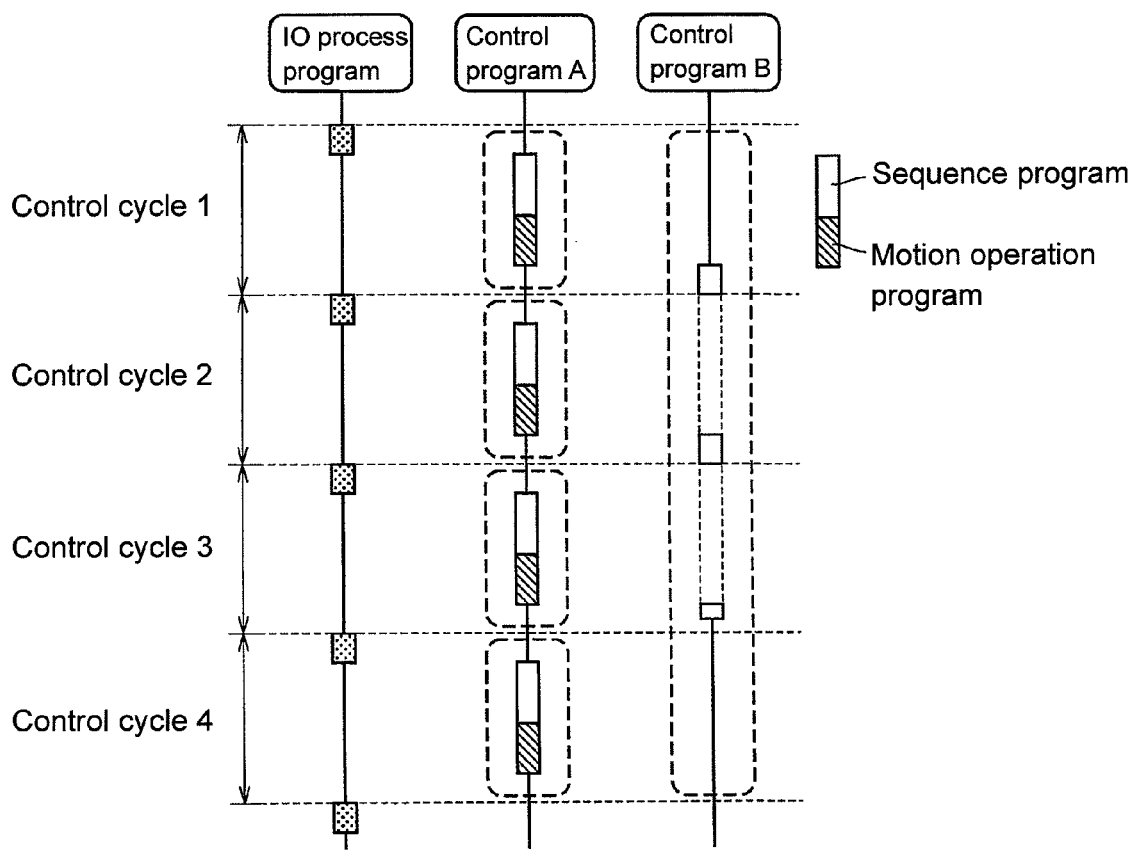
FIG. 4 is a sequence diagram showing an example execution operation in the CPU unit, use of which is supported by the controller (PLC) support apparatus according to an embodiment of the present disclosure.

FIG. 4 is a sequence diagram showing an example of execution operation performed by the CPU unit 13, use of which is supported by the controller (PLC) support apparatus 8 according to an embodiment of the present disclosure. In FIG. 4, along the time axis along which time elapses from the top to the bottom of the paper face, periods during which an IO process program, a control program A and a control program B are executed are shown.

Round-cornered rectangles indicated by the broken line along the time axes of the control programs A and B each indicate the execution cycle of the corresponding control program. In the example shown in FIG. 4, the control program A employs a single control cycle as its execution cycle, whereas the control program B employs four control cycles as its execution cycle. Also, it is assumed that the execution priority of the control program A is set higher than that of the control program B.

The sequence program (user program) of the control program A includes a motion command for realizing motion control, and the motion operation program 234 is called and executed as a result of execution of the motion command. In contrast, the sequence program of the control program B does not include a motion command.

When a control cycle 1 is started, the IO process program is executed due to execution control performed by the scheduler program 212.

When the output process and the input process due to execution of the IO process program have finished, the control program A is executed due to execution control performed by the scheduler program 212. When executing the control program A, the sequence program is first executed, and then the motion operation program 234 is executed. The sequence command operation program 232 is executed every time it is called during execution of the sequence program. The entire control program A (the sequence program and the motion operation program) is configured as a single thread, and is executed continuously without involvement of the scheduler program 212 during execution.

When the execution of the control program A is ended, the control program B is executed due to execution control performed by the scheduler program 212. However, since the control cycle 1 ends (a control cycle 2 starts) while the control program B is being executed, execution of the control program B is interrupted at that time.

Also in the control cycle 2 onward, execution of the IO process program and the control program A is repeated in the same manner as in the control cycle 1. When execution of the control program A in the control cycle 2 ends, the unexecuted portion of the control program B is executed. However, the control cycle 2 also ends while the control program B is being executed, and thus execution of the control program B is again interrupted.

Execution of the control program B whose execution has been recommenced in a control cycle 3 ends before the end of the control cycle 3.

Although the execution cycle of the control program B that has started in the control cycle 1 has not yet ended in a control cycle 4, since execution of the control program B in that execution cycle has already ended in the control cycle 3, the control program B is not executed in the control cycle 4.

E. Hardware Configuration of Support Apparatus

Next, the controller support apparatus 8 for performing, for example, generation of programs executed by the PLC 1 and maintenance of the PLC 1 will be described.

Figure 5:
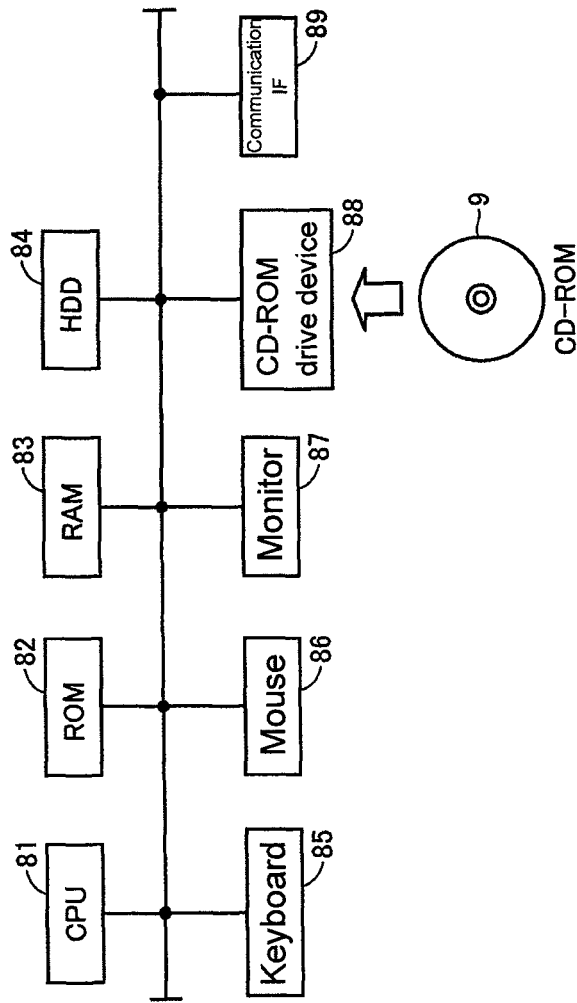
FIG. 5 is a schematic diagram illustrating a hardware configuration of the controller support apparatus according to an embodiment of the present disclosure.

FIG. 5 is the schematic diagram illustrating a hardware configuration of the controller support apparatus 8 according to an embodiment of the present disclosure. Referring to FIG. 5, the controller support apparatus 8 is typically configured by a general-purpose computer. Note that from the standpoint of maintenance, the controller support apparatus 8 is preferably configured by a laptop personal computer, which has good portability.

Referring to FIG. 5, the controller support apparatus 8 includes a CPU 81 that executes various types of programs including an OS, a ROM (Read Only Memory) 82 that stores an BIOS and various types of data, for example, and a memory RAM 83 that provides a working region for storing data that is necessary for execution of programs by the CPU 81, and a hard disk (HDD) 84 that stores, for example, programs executed by the CPU 81 in a non-volatile manner. The CPU 81 corresponds to the operation unit of the controller support apparatus 8, and the ROM 82, the RAM 83 and the hard disk 84 correspond to the storage unit of the controller support apparatus 8.

The controller support apparatus 8 further includes a keyboard 85 and a mouse 86 that receive operation from a user, and a monitor 87 for presenting information to the user. In addition, the controller support apparatus 8 includes a communication interface (IF) 89 for communicating with the PLC 1 (CPU unit 13) and the like.

As described later, various types of programs executed by the controller support apparatus 8 are stored in a CD-ROM 9 and distributed. The programs stored in the CD-ROM 9 are read by a CD-ROM (Compact Disk-Read Only Memory) drive 88 to be stored in the hard disk (HDD) 84, for example. Alternatively, a configuration may be adopted in which programs are downloaded through a network from a superordinate apparatus such as a host computer.

As described above, since the controller support apparatus 8 is realized by using a general-purpose computer, a further description of the controller support apparatus 8 will not be given.

F. Software Configuration of Controller Support Apparatus

Next, referring to FIG. 6, a software group used for the controller support apparatus 8 according to the present embodiment to provide various types of functions will be described.

Figure 6:
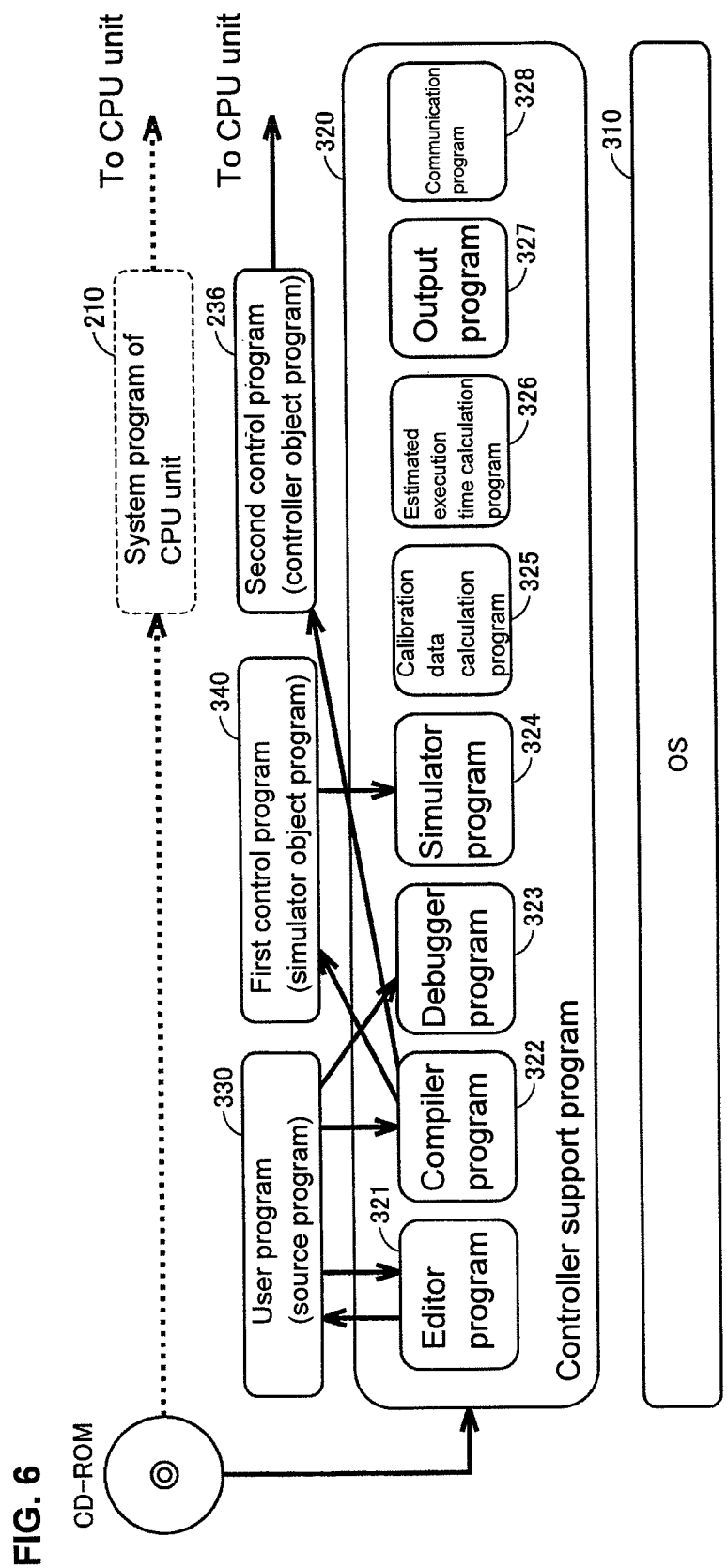
FIG. 6 is a schematic diagram illustrating a software configuration of the controller support apparatus according to an embodiment of the present disclosure.

FIG. 6 is a schematic diagram illustrating the software configuration of the controller support apparatus 8 according to an embodiment of the present disclosure. Referring to FIG. 6, an OS 310 is executed in the controller support apparatus 8, and an environment is provided in which execution of various types of programs included in a controller support program 320 is possible.

The controller support program 320 includes an editor program 321, a compiler program 322, a debugger program 323, a simulator program 324, a calibration data calculation program 325, an estimated execution time calculation program 326, an output program 327, and a communication program 328. Each program included in the controller support program 320 is, typically, distributed in a state stored in the CD-ROM 9, and installed on the controller support apparatus 8.

The editor program 321 provides functions for generating a user program (source program) 330 such as an input function and an edit function. More specifically, the editor program 321 provides, in addition to a function of generating the source program 330 of the user program 236 by the user operating the keyboard 85, the mouse 86 or the like, a function of saving and a function of editing the generated source program 330. Also, the editor program 321 externally receives a source program of the control program 230 (in particular, the user program 236), or edits a source program of the existent control program 230 according to user's operations.

The compiler program 322 provides a function of generating the user program (second control program) 236 in an object program format that is executable by the microprocessor 100 of the CPU unit 13 by compiling the source program 330 of the control program. Also, the compiler program 322 provides a function of generating a user program (first control program) 340 in an object program format that is executable by the CPU 81 of the controller support apparatus 8 by compiling the source program 330 of the control program. This user program 340 is an object program for simulation, which is used for the controller support apparatus 8 to simulate operations of the PLC 1.

The debugger program 323 provides a function of debugging the user program (source program) 330. This debugging includes operations such as partially executing the source program by executing a region of the source program designated by the user, and tracking temporal changes in variable values during execution of the source program, for example.

When the simulator program 324 is executed, it builds a simulator of the CPU unit 13 (controller) of the PLC 1 in the controller support apparatus 8. The simulator provides functions described below.

(1) A function of a real-time OS of the CPU unit 13 that starts the control cycle upon a signal from a system timer.

(2) A function of the scheduler program 212 of the CPU unit 13 that controls execution of the control program 230 according to the execution priority and the execution cycle of the control program.

(3) A function of the output process program 214 and the input process program 216 of the CPU unit 13.

(4) A function of providing input data in place of an object to be controlled, and if possible, a function of simulating the object to be controlled that operates as a result of receiving output data and reflecting the operation result to the input data.

Also, the simulator program 324 provides a program corresponding to the sequence command operation program 232 and/or the motion operation program 234 in the CPU unit 13, which is necessary for the first control program (simulator object program) 340 to operate on a simulator.

Since the execution code of the first control program (simulator object program) 340 can be executed by the CPU 81 of the controller support apparatus 8, the execution code is directly executed by the CPU 81 of the controller support apparatus 8 under execution control or support in the above-described execution environment.

Alternatively, the simulator program 324 may vertically build the microprocessor 100 of the CPU unit 13 so as to operate the second control program (controller object program) 236 on the simulator. In this case, the first control program (simulator object program) 340 and the second control program (controller object program) 236 are the same program, and thus these programs need not be generated separately.

Also if the CPU 81 of the controller support apparatus 8 and the microprocessor 100 of the CPU unit 13 are the processors of the same system, and the CPU 81 can execute the execution code of the second control program (controller object program) 236, the first control program (simulator object program) 340 and the second control program (controller object program) 236 will be the same program.

Figure 7:
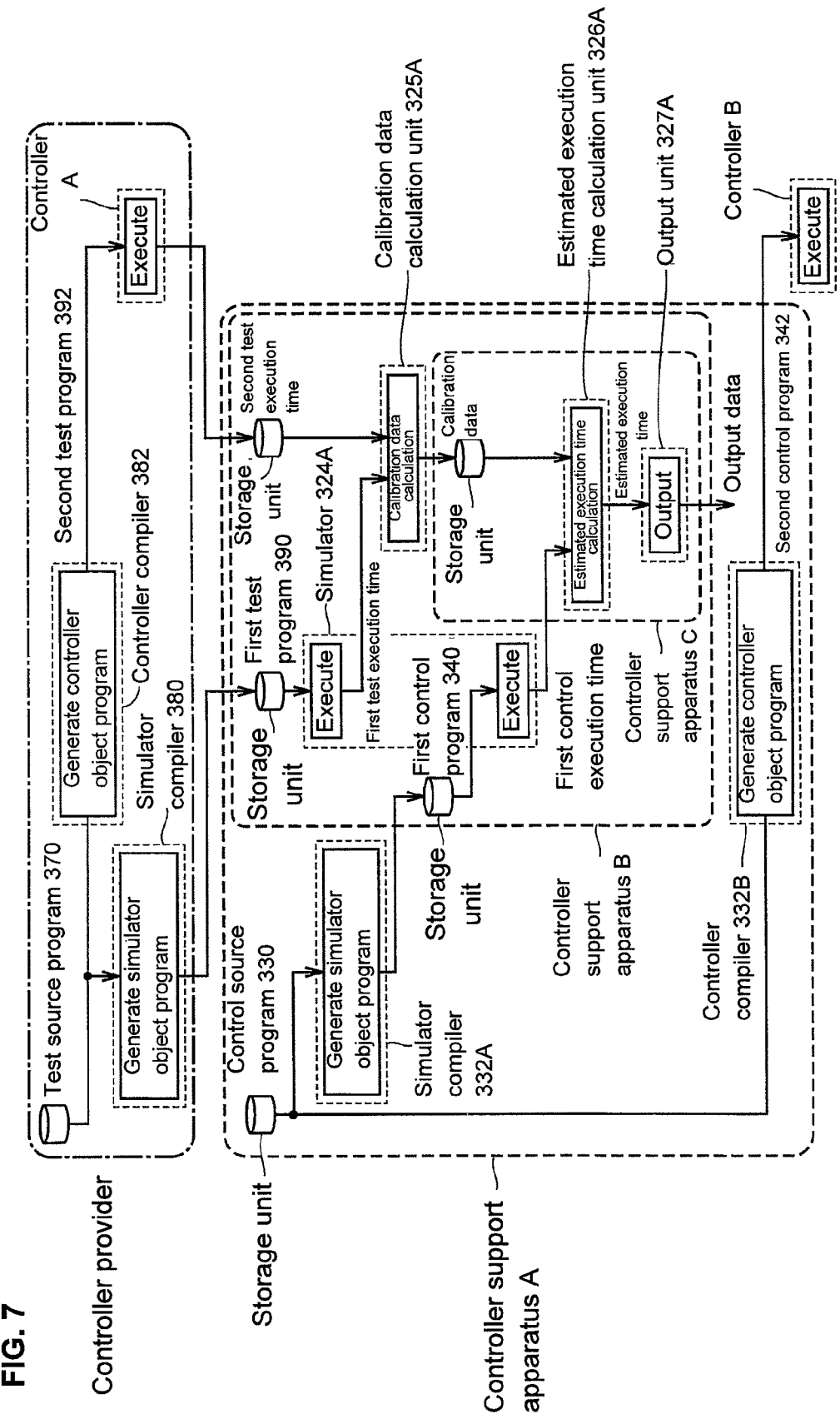
FIG. 7 is a schematic diagram illustrating an overall process relating to the controller support apparatus according to an embodiment of the present disclosure.

The calibration data calculation program 325 configures, as a result of being executed, a calibration data calculation unit 325A that is shown in FIG. 7 and is described below. The estimated execution time calculation program 326 configures, as a result of being executed, an estimated execution time calculation unit 326A that is shown in FIG. 7 and is described below. The output program 327 configures, as a result of being executed, an output unit 327A that is shown in FIG. 7 and is described below. Processes provided by these programs will be described later with reference to FIG. 7.

The communication program 328 provides a function of transferring the object program 236 for the CPU unit 13 of the control program 230 to the CPU unit 13 of the PLC 1.

Generally, the system program 210 mounted on the PLC 1 is stored in the non-volatile memory 106 of the CPU unit 13 at the stage of manufacturing the CPU unit 13. However, by storing the system program 210 in the CD-ROM 9, it is also possible for the user to copy the system program 210 in the CD-ROM 9 to the controller support apparatus 8, and to transfer the copied system program 210 to the CPU unit 13 by using functions provided by the communication program 328. Furthermore, by storing the real-time OS 200 to be executed by the CPU unit 13 of the PLC 1 in the CD-ROM 9, the real-time OS 200 can also be reinstalled on the PLC 1 by user's operations.

G. Overall Process Relating to Controller Support Apparatus g1: General Description Next, referring to FIG. 7, a series of processes relating to control program execution time estimation as well as programs and the data flow between the processes will be described in addition to the processes performed by the controller support apparatus 8.

FIG. 7 is a schematic diagram illustrating an overall process relating to the controller support apparatus 8 according to an embodiment of the present disclosure. The controller support apparatus 8 whose software configuration is illustrated in FIG. 6 corresponds to a controller support apparatus A shown in FIG. 7.

The method of estimating the execution time of a control program shown in FIG. 7 is mainly configured by a step of calibration data calculation process and a step of estimated execution time calculation process.

The calibration data calculation process is a process of calculating calibration data that represents the relation between the execution time at the controller and the execution time at the simulator that are measured in advance for a test program for calibration.

In the estimated execution time calculation process, an execution time of a control program measured with a simulator is acquired, and the execution time is converted using the calibration data, thereby calculating an estimated value of the execution time obtained when the control program is executed by the controller.

Each process is described below in detail.

g2: Calibration Data Calculation Process

First, a source program (test source program) 370 of the test program is prepared.

A simulator object program (first test program) 390 is generated from the test source program 370 by using a simulator compiler 380. Also, a controller object program (second test program) 392 is generated from the test source program 370 by using a controller compiler 382.

The execution time of the second test program 392 is measured by executing the second test program 392 by a controller A, and the data of a second test execution time, which is the execution time of the second test program 392, is acquired.

Processes described so far are generally performed by a supplier of the controller (manufacturer, distributor, or technical service provider of the controller, for example), and the first test program 390 and the second test execution time are provided to the user. Note that the processes described so far may be performed by the user.

The first test program 390 is executed by a simulator 324A, the execution time thereof is measured, and the data of a first test execution time, which is the execution time of the first test program 390, is acquired. Then, calibration data that represents the relation between the first test execution time and the second test execution time is calculated.

As described above, the calibration data calculation process is a process of calculating calibration data that represents the relation between the first test execution time and the second test execution time. Here, the first test execution time is an execution time measured at the simulator of the first test program 390, which is an object program that is generated from the test source program 370 and that operates at a simulator of a controller. Also, the second test execution time is an execution time measured at the controller of the second test program 392, which is an object program that is generated from the test source program 370 and that operates at the controller.

g3: Estimated Execution Time Calculation Process

Next, the control source program 330, which is a source program of the control program generated in accordance with an object of control of the user, is prepared.

The simulator object program (first control program) 340 is generated from the control source program 330 by using a simulator compiler 322A.

The first control program 340 is executed at the simulator 324A, the execution time thereof is measured, and data of a first control execution time, which is the execution time of the first control program, is acquired.

By converting the first control execution time using the calibration data, an estimated execution time, which is an estimation value of the execution time of a second control program 342 at a controller, the second control program 342 being an object program that is generated from the control source program 330 and that operates at the controller, is calculated.

The second control program 342 is generated from the control source program 330 by using a controller compiler 322B. Actually, the second control program 342 may be generated after the control source program 330 is modified as required based on the estimated execution time. The generated second control program 342 is transferred to a controller B, and is executed by the controller B. Note that the controller A and the controller B can be regarded as the same model in terms of the execution time.

As described above, the estimated execution time calculation process is a process of calculating the estimated execution time, which is an estimation value of the execution time of the second control program 342 at the controller, the second control program 342 being an object program that is generated from the control source program 330 and that operates at the controller, by converting, using the calibration data, the first control execution time, which is the execution time of the first control program 340 measured at the simulator 324A, the first control program 340 being an object program that is generated from the control source program 330 serving as the source program of the control program, which is generated in accordance with an object of control of the user, and that operates at the simulator 324A.

If the estimated execution time is calculated, a process of generating output data that represents the estimated execution time and outputting the output data is executed. The process of generating and outputting the output data is, for example, a process of generating display data for displaying the estimated execution time on the screen of the monitor 87, and displaying the display data. The process of generating and outputting output data may be a process of generating and sending data for sending the estimated execution time to other apparatuses. The process of outputting output data may be a process of storing the output data in a storage unit that is accessible from the outside of the controller support apparatus 8.

g4: Variation

If the simulator (controller support apparatus 8) and the controller (PLC 1) can execute the same object code, it is not necessary to use different compilers as the simulator compiler and the controller compiler, and a common compiler can be used. In this case, the first test program 390 and the second test program 392 will be the same program, and the first control program 340 and the second control program 342 will be the same program.

As the simulator compiler 380 used for compiling the test source program 370 and the simulator compiler 322A used for compiling the control source program 330, compilers are used that are capable of generating the same object program if the same source program is compiled. This applies to the controller compilers as well.

g5: Other Embodiments

It is convenient that the controller support apparatus 8 is configured, as illustrated as the controller support apparatus A in FIG. 7, such that all the processes performed after provision of the first test program 390 and the second test execution time can be executed by a single apparatus.

However, from the standpoint of execution time estimation, generation of the object program may be performed by a different apparatus, and the processes performed by the controller support apparatus 8 may be limited to those indicated with the controller support apparatus B in FIG. 7.

Alternatively, the simulator may be configured by a different apparatus, and the controller support apparatus 8 may acquire the first control execution time from the simulator as the different apparatus.

Alternatively, the calibration data calculation process may be performed by a different apparatus, and the controller support apparatus 8 may acquire and store the calculated calibration data for use. Then, from the stand point of execution time estimation, the processes performed by the controller support apparatus 8 may be limited to those indicated in FIG. 7 with a controller support apparatus C.

It is preferable to realize the controller support apparatuses A, B and C using portable or desktop personal computers.

Note that in any case, once the calibration data has been calculated, the stored first test program 390 and second test execution time may be deleted.

The controller support apparatus C shown in FIG. 7 can be expressed as described below. That is, the controller support apparatus C includes a storage unit (the ROM 82, the RAM 83 and the hard disk 84 in FIG. 5) and an operation unit (the CPU 81 in FIG. 5). The storage unit is used for storing the controller support program 320 and calibration data that represents the relation between the first test execution time and the second test execution time. The first test execution time is an execution time measured at the simulator of the first test program 390, which is an object program that is generated from the test source program 370 and that operates at the controller. The second test execution time is an execution time measured at the controller of the second test program 392, which is an object program that is generated from the test source program 370 and that operates at the controller.

The controller support program 320 causes the operation unit (CPU 81) to execute the processes described below.

(1) A process of acquiring the first control execution time, which is an execution time measured at a simulator of the first control program 340, which is an object program that is generated from the control source program 330 serving as the source program of the control program generated in accordance with an object of control of the user, and that operates at a simulator.

(2) A process of calculating the estimated execution time, which is an estimation value of the execution time at the controller of the second control program 342, which is an object program that is generated from the control source program 330 and that operates at the controller, by converting the first control execution time using the calibration data.

(3) A process for outputting data representing the estimated execution time.

Also, the controller support apparatus B is assumed to display the estimated execution time in a display unit (the screen of the monitor 87 shown in FIG. 5). The controller support apparatus B is an apparatus configured by adding the following configurations to the controller support apparatus C. That is, the controller support apparatus B further includes a display unit. The storage unit is used for further storing the first control program 340, the first test program 390 and the second test execution time. The controller support program 320 further causes the operation unit (CPU 81) to execute the following processes.

(4) A process of causing the controller support apparatus to function as the simulator.

(5) A process of measuring the first test execution time by executing the first test program 390 by the simulator.

(6) A process of calculating the calibration data from the first test execution time and the second test execution time (7) A process of measuring the first control execution time by executing the first control program 340 by the simulator.

The process for outputting data representing the estimated execution time described above is a process of generating display data for displaying the estimated execution time by the display unit.

H. Display Example of Estimated Execution Time

Next, an output example (display example) of the estimated execution time calculated by the processes described above will be described.

Figure 8:
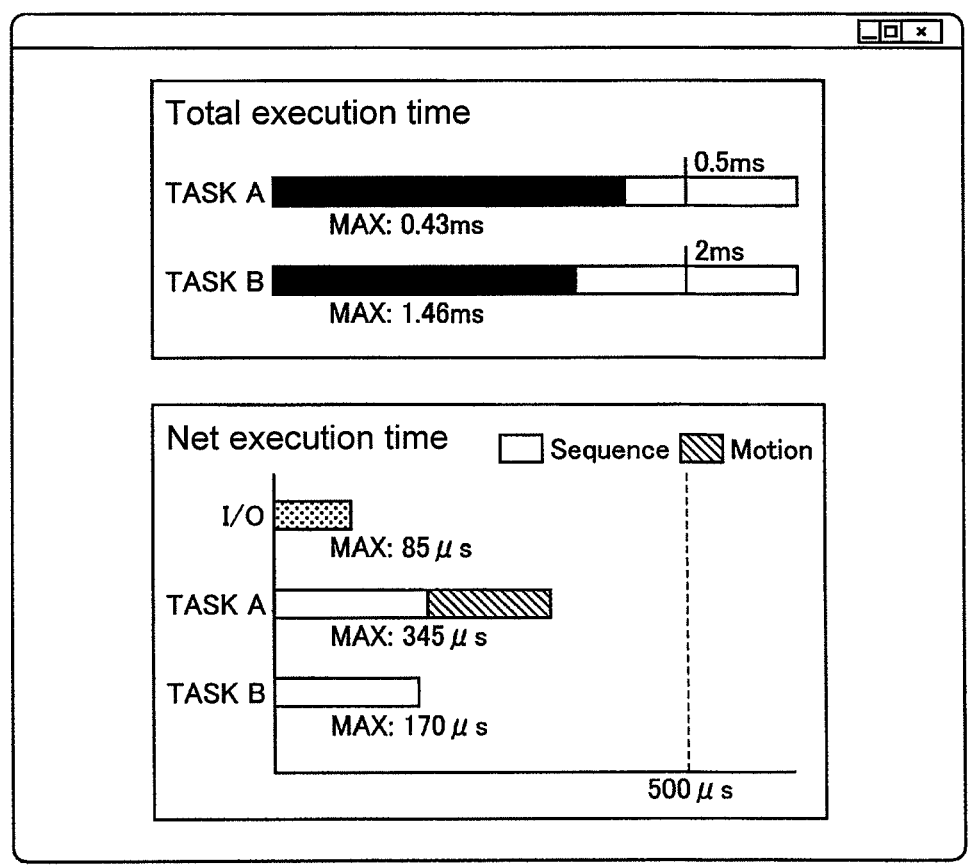
FIG. 8 is a diagram showing an example of a display screen of estimated execution time, the screen being output from the controller support apparatus according to an embodiment of the present disclosure.

FIG. 8 is a diagram showing an example of the display screen of estimated execution time output from the controller support apparatus 8 according to an embodiment of the present disclosure.

In the example of the display screen of estimated execution time shown in FIG. 8, the control programs A and B shown in FIG. 4 are subjected to execution time estimation. In the display screen, the control program A and the control program B are respectively indicated as "TASK A" and "TASK B".

The time displayed as the net execution time is the estimated execution time. The net execution time refers to a time period that excludes an execution pausing time, and during which the control program is actually being executed. For example, in FIG. 4, the control program B is executed in three divided executions with two execution pausing periods interposed therebetween. The total of the time periods of the three divided executions, during which the control program B is actually being executed, serves as the net execution time.

In the display unit of the net execution time, the execution time of the IO process is also displayed. The IO process is indicated as "I/O". Note that the process of obtaining the execution time of the IO process is not shown in FIG. 7. The execution time of the IO process has a correlation with the number of other units connected to the CPU unit 13 and the amount of output data and input data, and the larger the number of other units or the amount of data, the longer the execution time of the IO process. The controller support apparatus 8 holds such information in order to set the information in the controller, and thus can calculate the estimation value of the execution time of the IO process using the information.

"500 μs" in the display unit of the net execution time indicates that the interval of the control cycle is 500 μs.

In the simulator, the first control execution time that serves as the basis of estimated execution time (net execution time) calculation can be measured by executing the control programs A and B separately without execution pausing period. Also, as with actual execution by the controller, in the case of execution by the simulator as well, programs may be executed in accordance with the execution priority and the execution cycle according to the sequence shown in FIG. 4 so as to measure time actually required for the execution.

Measurement of the first control execution time and calculation of the estimated execution time may be repeated a plurality of times. When a control program is repeatedly executed, execution conditions such as values of variables used in the control program change, and accordingly, the execution time varies. The MAX value displayed with the graph of the net execution time indicates a maximum value obtained when the control program is repeatedly executed. In addition, a minimum value or an average value may be displayed.

The estimated execution time of the control program A is calculated separately for the sequence operation portion and the motion operation portion, which are separately indicated in the graph display as well.

The total execution time means a period of time from the start of an execution cycle of each control program to the end of execution of the control program in that execution cycle. That is, the total execution time of the control program A corresponds to a period of time from the beginning of each control cycle in FIG. 4 to the end of execution of the control program A in that control cycle. The execution time of the IO process is included in this period of time in addition to the execution time of the control program A.

Similarly, the total execution time of the control program B corresponds to a period of time from the beginning of the control cycle 1 in FIG. 4 to the end of execution of the control program B in the control cycle 3. In this period of time is obtained by adding the execution time for three times of the IO process and the execution time for three divided executions of the control program A, which are executed by the end of execution of the control program B.

"0.5 ms" and "2 ms" in the display unit of the total execution time each indicate the interval of the execution cycle of the corresponding control program. Also, as with the case of the net execution time, a maximum value of the total execution time of each control program is displayed. Displaying the total execution time enables a user to know whether execution of each control program can be completed within the corresponding execution cycle time.

Figure 9:
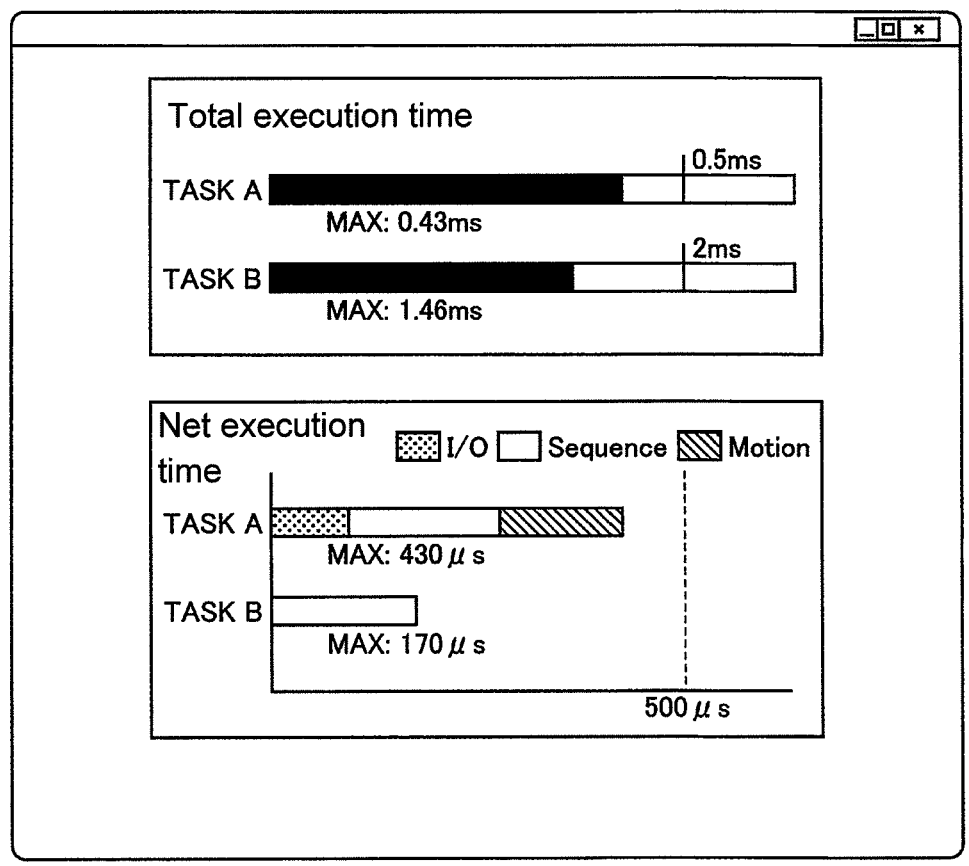
FIG. 9 is a diagram showing another example of the display screen of estimated execution time, the screen being output from the controller support apparatus according to an embodiment of the present disclosure.

FIG. 9 is a diagram showing another example of the display screen of the estimated execution time output from the controller support apparatus 8 according to an embodiment of the present disclosure.

The display screen shown in FIG. 9 differs from that shown in FIG. 8 in that the execution time of the IO process is included in the TASK A in the display unit of the net execution time.

That is, in the display screen shown in FIG. 9, the execution time of the IO process that is executed at the same interval as that of the execution cycle of a control program (in this case, the control program A) is added to the execution time of that control program in the display. In this manner, display of the estimated execution time of a control program includes the display in which the execution time of the control program and the execution time of other processes executed in combination with the control program are added. In other words, it is not always necessary to display the estimated execution time of the control program itself, and it is sufficient to display a time that includes the estimated execution time of the control program so as to help a user in deciding the control cycle interval or the execution cycle interval, or how to divide the control program, for example.

The graph of the TASK A for the net execution time is displayed such that the execution time of the IO process and the execution time of the control program A can be distinguished. "MAX value" displayed with the graph indicates the execution time including the IO process time, and thus the estimated execution time of the control program is not displayed as a numerical value. In this manner, the estimated execution time of the control program may be displayed by a graph only.

Furthermore, only one of the net execution time and the total execution time may be displayed. Displaying the total execution time also serves as an embodiment of display of the estimated execution time of the control program.

I. Process of Calculating Calibration Data

Next, a process of calculating calibration data representing the relation between the first test execution time and the second test execution time will be described.

Figure 10:
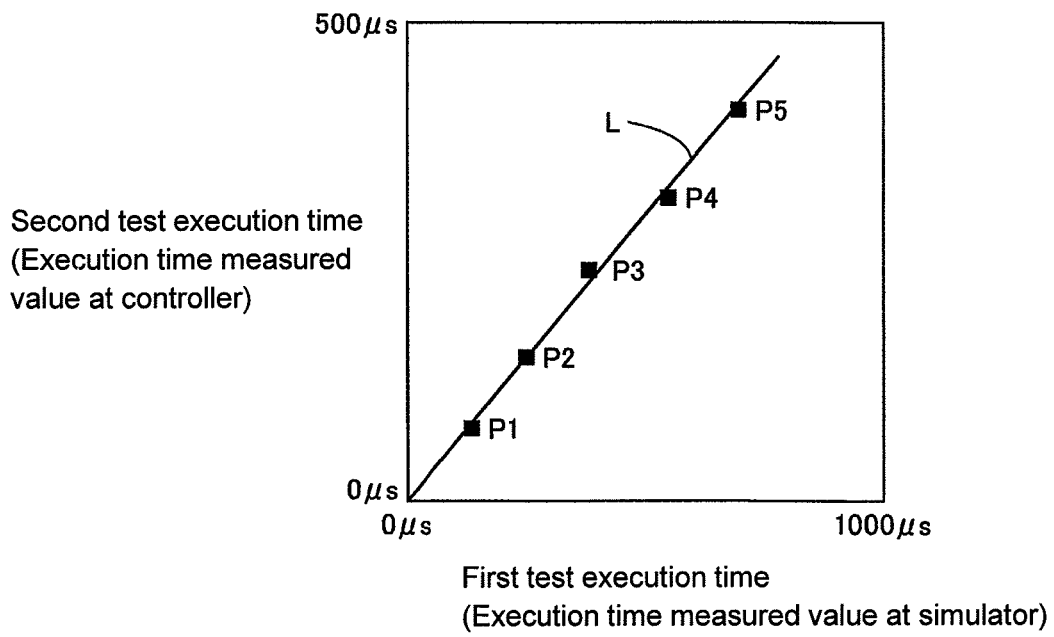
FIG. 10 is a diagram showing an example of the relation between a first test execution time and a second test execution time.

FIG. 10 is a diagram showing an example of the relation between the first test execution time and the second test execution time. In FIG. 10, the X axis (horizontal axis) indicates the first test time (measured value of the execution time of the first test program 390 at the simulator), and the Y axis (vertical axis) indicates the second test execution time (measured value of the execution time of the second test program 392 at the controller).

As described above, the first test program 390 and the second test program 392 are object programs generated from the same test source program 370. Measurement points P1 to P5 shown in the graph of FIG. 10 indicate execution times of the first and test programs generated from five types of test source programs 370 that include mutually different numbers of commands to be executed.

Note that the measurement points P1 to P5 may take measured values of execution time obtained when each program is executed one time. However, taking into account the fact that the execution time may vary at each execution depending on execution conditions such as input variable values, it is preferable to employ an average value of execution times obtained by executing a single program a plurality of times.

When a general-purpose computer is used as the controller support apparatus 8, the first test program 390 is generally executed under a non-real-time operating system environment, and thus execution of the first test program may be interrupted by the operating system. Since the measured value of the execution time in such a case will be an abnormally large value, it is necessary to eliminate such an abnormal value from calculation when obtaining the average value of the execution time. Similarly, the first control execution time, which is the basis of calculation of the estimated execution time, may also take an abnormal value. Thus, it is necessary to eliminate such an abnormal value from calculation of the estimated execution time.

A straight line L is obtained by using a least-square method so as to achieve the smallest error with respect to the measurement points P1 to P5. In this example, the straight line L is expressed by the equation Y=aX. The proportionality coefficient "a" serves as calibration data.

The estimated execution time can be calculated by multiplying the first control execution time that is the control program execution time measured at the simulator by the calibration data "a".

The straight line L can also be expressed by the equation Y=aX+b, and in this case, the values of "a" and "b" serve as calibration data.

Since the first test execution time and the second test execution time substantially have a proportional relation, it is possible to express the relation therebetween by a straight line, but in some cases, it is better to use multidimensional functions such as a quadric curve or a cubic curve in order to express the relation more precisely. In such cases, coefficients defining the multidimensional functions serve as calibration data.

A possible cause for the case where the relation between the first test execution time and the second test execution time cannot be expressed by the straight line is influence of operations performed by a cash mechanism of the CPU 81 of the controller support apparatus 8 or a microprocessor of the controller (the microprocessor 100 of the PLC 1). It is conceivable that due to the cash mechanism operations, the measured value of a short execution time may not take a value on the straight line obtained based on the measured values of execution times each having a certain amount of time.

The calibration data may be table-form data that shows a plurality of first test times and second test times corresponding to the first test times. When such calibration data is used, it is possible to obtain the estimated execution time corresponding to a first control execution time by selecting two first test times whose values having the value of the first control execution time therebetween, or several first test times having values close to the value of the first control execution time, and by interpolating a line or a curve based on data in the calibration data.

J. Server-Client Form

Although a case in which a process of estimating control program execution time is realized by a stand-alone form was described above as an example, the process may be realized by a so-called server-client form.

Figure 11:
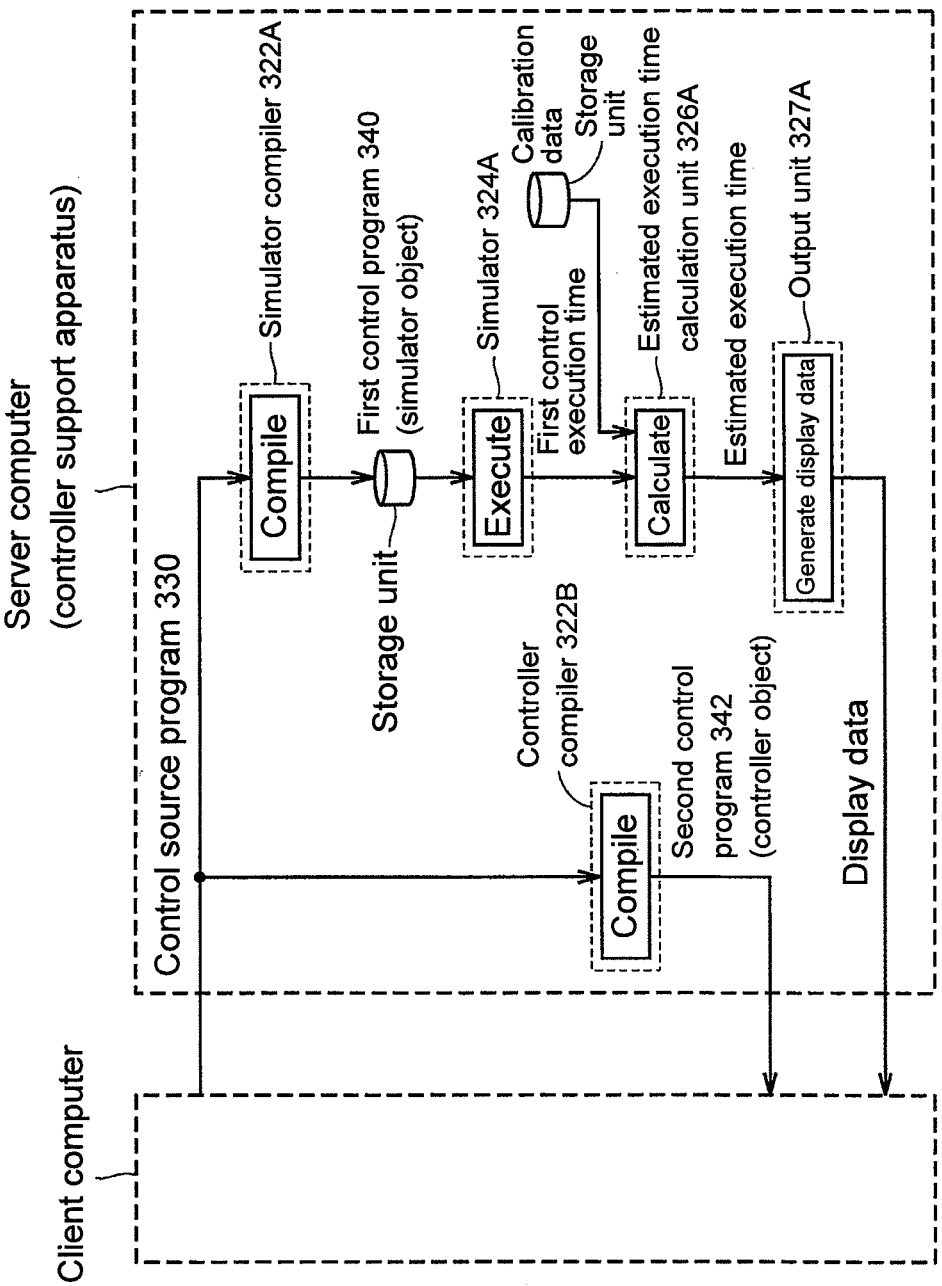
FIG. 11 is a schematic diagram illustrating an overall process relating to a controller support apparatus realized by a server computer according to an embodiment of the present disclosure.

FIG. 11 is a schematic diagram illustrating an overall process relating to a controller support apparatus realized by a server computer according to an embodiment of the present disclosure. FIG. 11 shows a series of processes relating to control program execution time estimation, as well as programs and the data flow between the processes when the controller support apparatus is realized by a server computer.

Referring to FIG. 11, the server computer that functions as the controller support apparatus includes a program group that functions as a simulator compiler 322A, a controller compiler 322B, a simulator 324A, an estimated execution time calculation unit 326A, and an output unit 327A.

For example, the server computer may be installed in the user's business place and connected to a client computer through LAN, or may be installed in the business place of the controller provider and connected to a client computer in the user's business place through the Internet.

Also, calibration data stored in the storage unit in FIG. 11 is calculated through the same processes shown in FIG. 7. A process of calculating the calibration data may be performed using a different computer, or the server computer may perform the whole or part of the process of calculating the calibration data. Note that when a simulator for executing the first test program is provided in a different computer, the simulator is required to be capable of executing the same program in the same execution time as the simulator in the server computer.

Even in the case where the server computer performs a series of processes up to obtaining the calibration data, in the stage where the server computer provides a service to a client computer, it is sufficient that the calibration data can be used. For this reason, programs and data used for obtaining the calibration data may be deleted from the server computer.

The control source program 330 is generated in the client computer and sent to the server computer.

The server computer generates, with the controller compiler 322B, a second control program 342 from the control source program 330 according to an instruction from the client computer, and sends the second control program 342 to the client computer. The server computer may not include the controller compiler 322B, and may not provide the service of generating the second control program 342.

The simulator compiler 322A generates a first control program (simulator object program) 340 from the control source program 330.

The simulator 324A executes the first control program 340 and measures the execution time thereof, namely, the first control execution time.

The estimated execution time calculation unit 326A uses the calibration data to calculate the estimated execution time from the first control execution time.

The output unit 327A generates, for example, display data for displaying the estimated execution time in the form shown in FIG. 8 or FIG. 9, and sends the display data to the client computer. The display data is, for example, HTML format data that can be displayed with a web browser. The output unit 327A may send only numerical value data indicating estimated execution time to the client computer, and allow the client computer to decide the display form thereof.

The server computer may not include the simulator compiler 322A, and may receive the first control program 340 generated at the client computer.

By configuring the server computer to include a simulator and calibration data, and perform the estimated execution time calculation process for a plurality of client computers, work for adding a new simulator and calibration data suitable for a new model of controller can be easier.

The controller support apparatus shown in FIG. 11 includes a configuration of the controller support apparatus C shown in FIG. 7, and in addition, includes at least the configurations described below. That is, the storage unit is further used for storing the first control program 340, and the controller support program 320 further causes the operation unit to execute a process of causing the controller support apparatus to function as the simulator 324A and a process of measuring the first control execution time by executing the first control program 340 by the simulator 324A.

The embodiments disclosed herein are meant to be in all aspects illustrative and not limiting. The scope of the disclosure is defined by the appended claims, rather than by the above explanations, and all equivalents and modifications to the claims are included in the scope of the disclosure.

INDEX TO THE REFERENCE NUMERALS

1 . . . PLC, 2 . . . field network, 3 . . . servo motor drivers, 4 . . . servo motors, 5 . . . remote IO terminal, 6 . . . detection switch, 7 . . . relay, 8 . . . controller support apparatus, 9 . . . CD-ROM, 10 . . . connection cable, 11 . . . PLC system bus, 12 . . . power supply unit, 13 . . . CPU unit, 14, 53 . . . IO units, 15 . . . special unit, 51 . . . remote IO terminal bus, 52 . . . communication coupler, 81 . . . CPU, 82 . . . ROM, 83 . . . RAM, 84 . . . hard disk, 85 . . . keyboard, 86 . . . mouse, 87 . . . monitor, 88 . . . CD-ROM drive, 100 . . . microprocessor, 102 . . . chip set, 104 . . . main memory, 106 . . . non-volatile memory, 108 . . . system timer, 110 . . . USB connector, 120 . . . PLC system bus controller, 122 . . . DMA control circuit, 124 . . . PLC system bus control circuit, 126, 146 . . . buffer memory, 130 . . . connector, 140 . . . field network controller, 142 . . . DMA control circuit, 144 . . . field network control circuit, 200 . . . real-time OS, 210 . . . system program, 212 . . . scheduler program, 214 . . . output process program, 216 . . . input process program, 218 . . . IO process program, 220 . . . other system programs, 230 . . . user program, 230 . . . control program, 232 . . . sequence command operation program, 234 . . . motion operation program, 236 . . . user program, 320 . . . controller support program, 321 . . . editor program, 322 . . . compiler program, 322A, 380 . . . simulator compiler, 322B, 382 . . . controller compiler, 323 . . . debugger program, 324 . . . simulator program, 324A . . . simulator, 325 . . . calibration data calculation program, 325A . . . calibration data calculation program, 326 . . . estimated execution time calculation program, 326A . . . estimated execution time calculation program, 327 . . . output program, 327A . . . output unit, 328 . . . communication program, 330 . . . control source program, 340 . . . first control program, 342 . . . second control program, 370 . . . test source program, 390 . . . first test program, 392 . . . second test program, SYS . . . system

What is claimed is:

1. A controller support apparatus, comprising:
a storage that stores a controller support program and calibration data representing a relationship between a first test execution time and a second test execution time; and
a processor, wherein
the first test execution time comprises an execution time of a first test program which is an object program generated from a test source program and operating at a simulator of a controller, and the first test execution time is measured at the simulator,
the second test execution time is an execution time of a second test program which is an object program generated from the test source program and operating at the controller, and the second test execution time is measured at the controller, and
the controller support program causes the processor to execute:
acquiring a first control execution time which is an execution time of a first control program which is an object program generated from a control source program, which is a source program of a control program generated in accordance with an object of control of a user, and operating at the simulator, and the first control execution time is measured at the simulator;
calculating an estimated execution time which is an estimated value of an execution time, at the controller, of a second control program which is an object program generated from the control source program and operating at the controller, by converting the first control execution time using the calibration data; and
outputting data representing the estimated execution time.

2. The controller support apparatus according to claim 1, wherein
the storage stores the first control program, and
the controller support program further causes the processor to execute:
causing the controller support apparatus to function as the simulator; and
measuring the first control execution time by executing the first control program at the simulator.

3. The controller support apparatus according to claim 2, wherein
the controller support apparatus further comprises a display,
the storage stores the first test program and the second test execution time,
the controller support program further causes the processor to execute:
measuring the first test execution time by executing the first test program at the simulator; and
calculating the calibration data from the first test execution time and the second test execution time, and
the process for outputting data representing the estimated execution time comprises generating display data for causing the display to display the estimated execution time.

4. A non-transitory computer readable storage medium storing a controller support program that allows a computer apparatus to estimate control program execution time, the program allowing the computer apparatus to perform:
acquiring a first control execution time comprising an execution time of a first control program which is an object program generated from a control source program, which is a source program of a control program generated in accordance with an object of control of a user, and operating at a simulator, the first control execution time being measured at the simulator;
calculating an estimated execution time comprising an estimated value of an execution time, at a controller, of a second control program which is an object program generated from the control source program and operating at the controller, by converting the first control execution time using calibration data representing a relationship between a first test execution time a second test execution time; and outputting data representing the estimated execution time, wherein the first test execution time is an execution time of a first test program which is an object program generated from a test source program and operating at a simulator of the controller, and the first test execution time is measured at the simulator, the second test execution time is an execution time of a second test program which is an object program generated from the test source program and operating at the controller, and the second test execution time is measured at the controller.

5. The non-transitory computer readable storage according to claim 4, wherein the storage stores the first control program, and the controller support program further causes the computer apparatus to perform:

causing the controller support apparatus to function as the simulator; and measuring the first control execution time by executing the first control program at the simulator.

6. The non-transitory computer readable storage according to claim 5, wherein the storage stores the first test program and the second test execution time, and the controller support program further causes the computer apparatus to perform:

measuring the first test execution time by executing the first test program at the simulator; and calculating the calibration data from the first test execution time and the second test execution time.

7. A method of estimating an execution time of a control program of a controller controlling an object to be controlled, the method being operated by a controller support apparatus, the controller support apparatus comprising:

a storage that stores a controller support program and calibration data representing a relationship between a first test execution time and a second test execution time; and a processor, wherein the first test execution time comprises an execution time of a first test program which is an object program generated from a test source program and operating at a simulator of a controller, and the first test execution time is measured at the simulator, the second test execution time is an execution time of a second test program which is an object program generated from the test source program and operating at the controller, and the second test execution time is measured at the controller; and the method comprising:

acquiring a first control execution time which is an execution time of a first control program which is an object program generated from a control source program, which is a source program of a control program generated in accordance with an object of control of a user, and operating at the simulator and the first control execution time is measured at the simulator;

calculating an estimated execution time which is an estimated value of an execution time, at the controller, of a second control program which is an object program generated from the control source program and operating at the controller, by converting the first control execution time using the calibration data; and outputting data representing the estimated execution time.

* * * * *